United States Patent [19]

Ishii et al.

[11] Patent Number: 4,857,965

[45] Date of Patent: * Aug. 15, 1989

[54] READER-PRINTER HAVING AN IMAGE ROTATION DEVICE

[75] Inventors: Kenjiro Ishii, Sagamihara; Yutaka Satoh, Yokohama; Fumio Fukumoto, Sagamihara; Hajime Otsuki, Yokohama; Yasuhide Kokura, Machida; Shuichi Saito, Kawasaki, all of Japan

[73] Assignee: Minolta Camera Kabushiki Kaisha, Osaka, Japan

[*] Notice: The portion of the term of this patent subsequent to Sep. 22, 2004 has been disclaimed.

[21] Appl. No.: 69,026

[22] Filed: Jul. 1, 1987

Related U.S. Application Data

[62] Division of Ser. No. 824,083, Jan. 30, 1986, Pat. No. 4,695,155.

[51] Int. Cl.⁴ .............................................. G03B 13/28
[52] U.S. Cl. ...................................................... 355/45
[58] Field of Search ...................................... 355/44, 45

[56] References Cited

U.S. PATENT DOCUMENTS

| 2,747,456 | 5/1956 | Waller et al. | 352/70 |
| 3,649,119 | 3/1972 | Rempala et al. | 355/45 |
| 3,907,418 | 9/1975 | Okuyama . | |
| 3,981,581 | 9/1976 | Freeman et al. | 355/44 |
| 4,436,391 | 3/1984 | Kashiwagi . | |
| 4,589,767 | 5/1986 | Yanagi et al. | 355/45 |
| 4,695,155 | 9/1987 | Ishii et al. | 355/45 |

FOREIGN PATENT DOCUMENTS 58-194023 11/1983 Japan .

Primary Examiner—Monroe H. Hayes
Attorney, Agent, or Firm—Burns, Doane, Swecker & Mathis

[57] ABSTRACT

Disclosed is a reader printer having an image rotation prism for adapting the direction of a microfilm image to suitable direction. The reader-printer has an image direction detecting means for forming the microfilm image successfully onto a copy paper without consideration of the direction of the image. The reader-printer also has a prism orientation detecting means for automatically eliminating difference between a location of the image and a location of the fed paper.

6 Claims, 10 Drawing Sheets

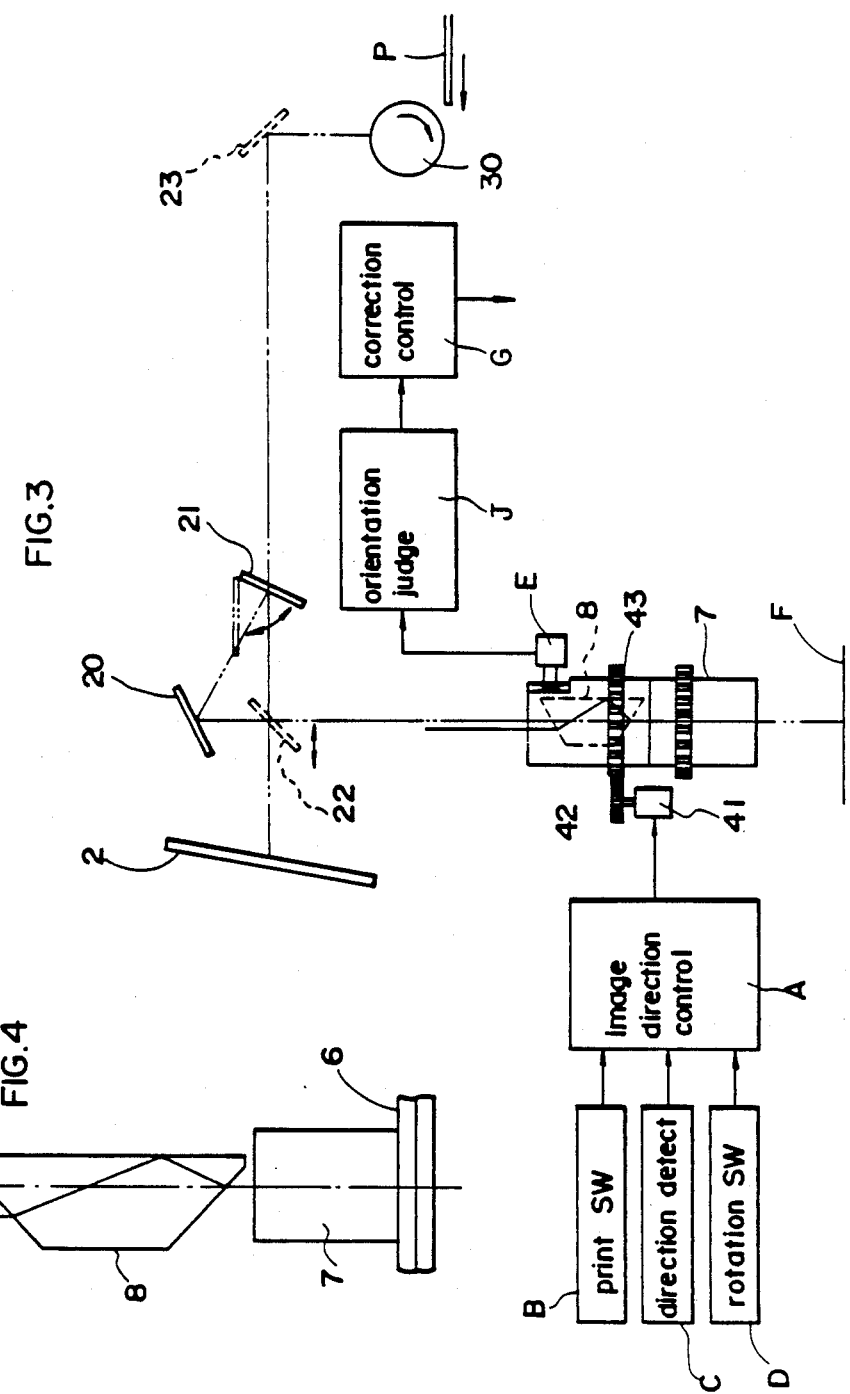

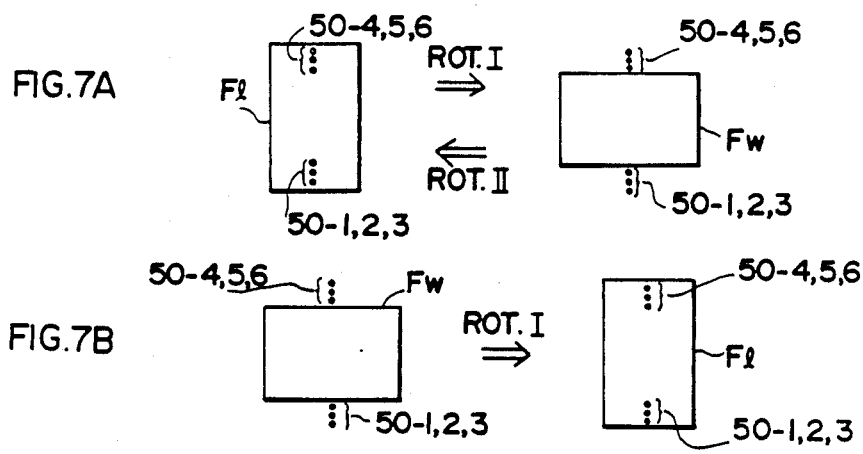
FIG.7A
FIG.7B
FIG.8
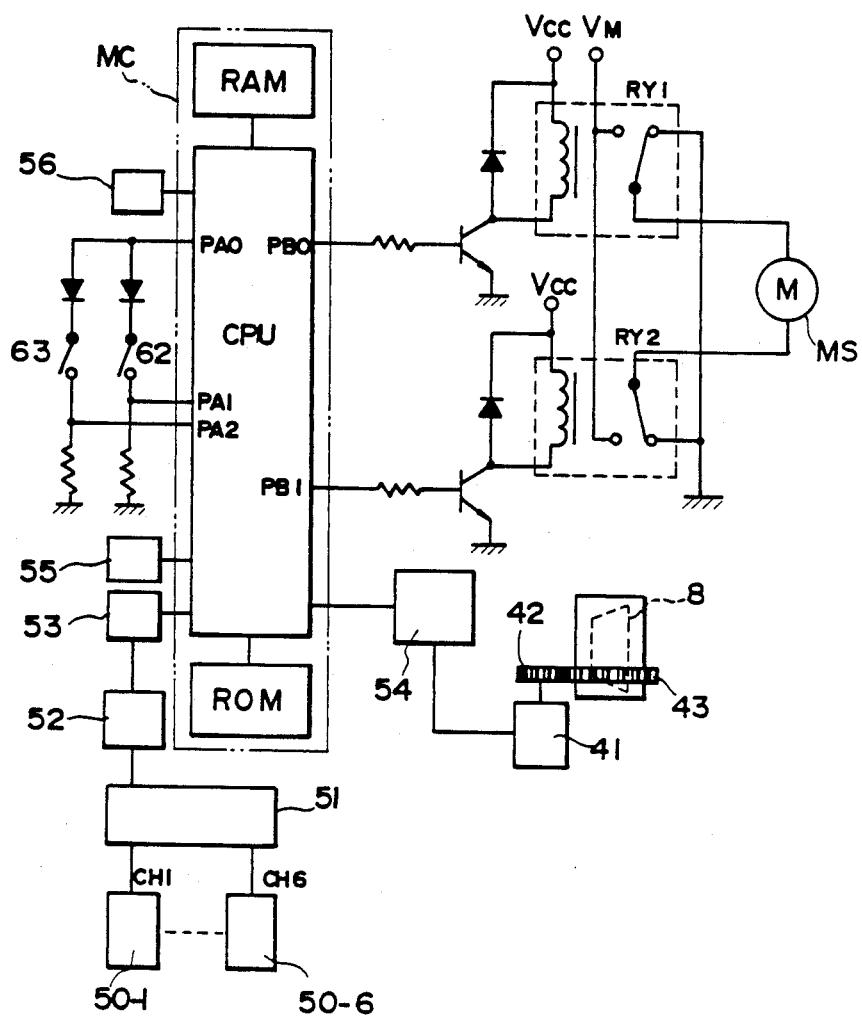

READER-PRINTER HAVING AN IMAGE ROTATION DEVICE

This application is a divisional of application Ser. No. 824,083 filed Jan. 30, 1986, now U.S. Pat. No. 4,695,155.

BACKGROUND OF THE INVENTION

The present invention relates to a reader-printer having a device for rotating an image of microfilm on a projection surface.

The frames on a microfilm are in a vertical or horizontal position relative to the film, while information is recorded in the frame in a vertical or horizontal position relative to the frame. If images on the microfilm are projected with the film in a definite position, it is likely that the image will be projected in an inappropriate orientation. For example, information projected as oriented horizontally in the reader mode is almost impossible to read. Further if the orientation in which the frame is projected is not in coincidence with the orientation of the copy paper in the printer mode, an incomplete copy will be obtained. These objections can be eliminated by rotating the microfilm, but the device for holding the film must then be rotated. This requires a complex arrangement.

U.S. Pat. No. 3,907,418 discloses an arrangement wherein the film image to be projected is rotated on a plane of projection by a prism. The prism employed is a trapezoidal prism, i.e., Dove prism, and is disposed at the light emergent side of a projection lens rotatably about the optical axis of the lens. The rotation of the prism rotates the image through twice the angle of rotation thereof. The arrangement of U.S. Pat. No. 3,907,418 is based on the assumption that although the frames are directed vertically or horizontally relative to the film, information is recorded in the frames in an upright position relative to the film, and is adapted to selectively determine whether the prism in an orientation in the reader mode is to be rotated through 45 degrees in operative relation with the change of mode to the printer mode, such that the prism is rotated only when the direction of the frame is not in coincidence with the orientation of the paper in the printer mode.

However, the disclosed technique still requires the user's manipulation and has yet to be improved in the ease of use.

The technique has another problem in that the prism wherein the incidence optical axis coincides with the emergence optical axis is large-sized, whereas use of a small prism for compacting the apparatus involves deviation between the incidence optical axis and the emergence optical axis to result in the deviation of the projected image on copy paper.

SUMMARY OF THE INVENTION

Accordingly, the main object of the present invention is to provide a reader-printer which has an image rotation device and which is easy to use.

Another object of the present invention is to provide a reader-printer including an image rotation prism which is automatically rotatable in accordance with the direction of the frame.

Still another object of the present invention is to provide a reader-printer wherein the position relation between the image to be projected and copy paper can be corrected automatically in accordance with the orientation of the image rotation prism.

These and other objects can be fulfilled by a reader-printer comprising means for detecting the direction of a frame to automatically control the rotation of an image rotation prism in accordance with the result of detection. The reader-printer further comprises means for detecting the orientation of the prism as rotated to correct noncoincidence of the image to be projected with copy paper in accordance with the result of detection.

BRIEF DESCRIPTION OF THE DRAWINGS

These and other objects or features of the present invention will become apparent from the following description of preferred embodiments thereof taken in conjunction with the accompanying drawings, in which:

FIG. 3 is a diagram for illustrating the present invention;

FIG. 4 is a diagram for illustrating abberation of an optical axis due to the presence of a prism;

FIGS. 7A and 7B are diagrams showing the relation of a frame and groups of photodetectors;

FIG. 8 is a circuit diagram according to the present invention;

In the following description, like parts are designated by like reference numbers throughout the several drawing figures.

DESCRIPTION OF THE PREFERRED EMBODIMENTS

Figure 1:
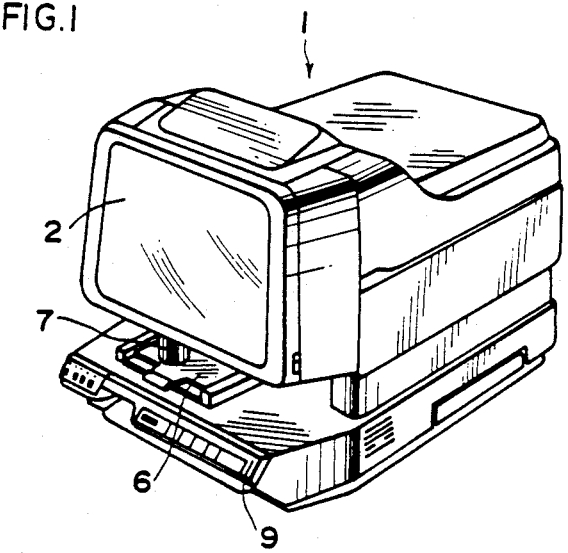
FIG. 1 is a perspective view showing a reader-printer to which the present invention is applied.
Figure 2:
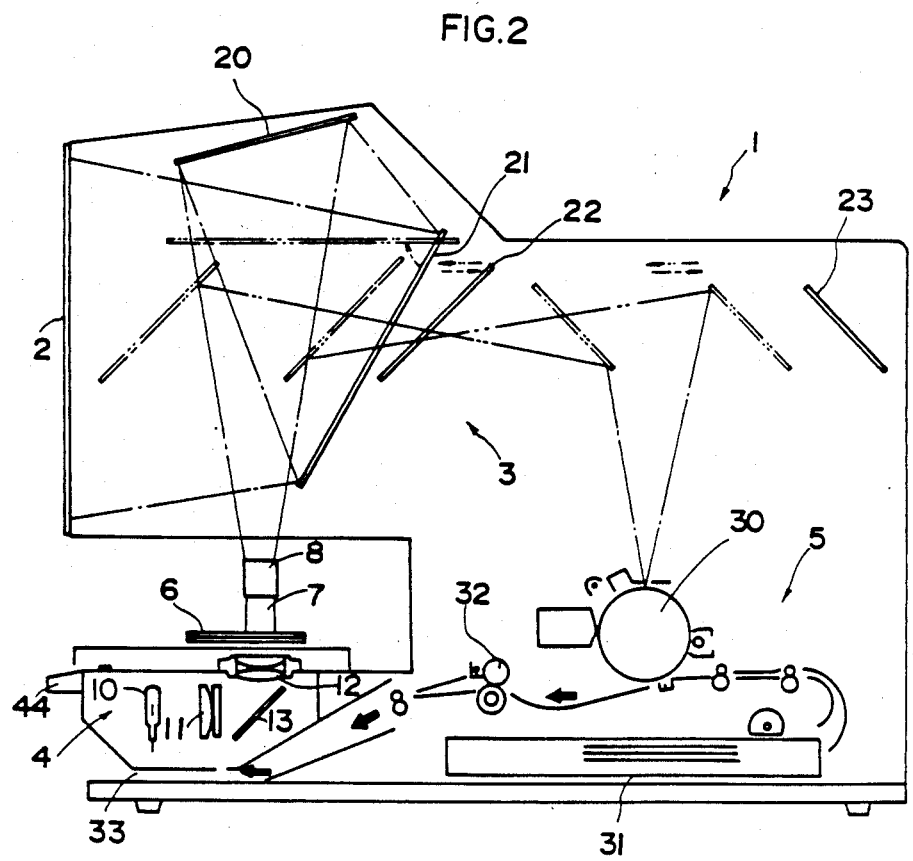
FIG. 2 is a schematic sectional view of the printer of FIG. 1.

With reference to FIGS. 1 and 2, the structure of a reader-printer to which the present invention is applied will be described generally. The reader-printer 1 has a screen 2 and a mirror system 3 at its upper portion, an illuminating system 4 and a printer system 5 at its lower portion, and a carrier 6 for holding a microfilm, a projection lens 7 and an image rotation prism 8 between the illuminating system 4 and the mirror system 3. An operation panel 9 is provided on the front side of the lower portion. The illustrated carrier 6 is designed for microfiches to hold the film between two glass plates which are movable forward or rearward and leftward or rightward and to position the desired frame at a projection position. The carrier 6 is replaceable by a carrier for a roll of film. The image rotation prism 8, which is a Dove prism, rotates an image through an angle equal to twice the angle of rotation of the prism. As will be described in detail later, the prism has a minimum size required for the rotation of images.

The illuminating system 4 comprises a lamp 10, condenser lenses 11, 12 and a mirror 13 for illuminating the microfilm held by the carrier 6. An image of the film is transmitted to the mirror system 3 through the projection lens 7 and the prism 8.

The mirror system 3 comprises a fixed mirror 20 disposed immediately above the projection lens 7, a pivotal mirror 21 pivotally movable between a position (solid line) for guiding the light from the fixed mirror 20 to the screen 2 and a rectracted position (broken line), and scan mirrors 22, 23 which are reciprocatingly movable together. The scan mirrors 22, 23 are in a retracted position indicated in solid lines in FIG. 2 in the reader mode, while in the printer mode, they are reciprocatingly movable between two positions indicated in broken lines, after the retraction of the pivotal mirror 21, whereby the film image is guided to a photosensitive drum 30.

Arranged around the drum 30 are elements for executing a known electrophotographic process. A toner image formed on the drum 30 by some of these elements is transferred to copy paper supplied from a cassette 31. After the image transfer, the paper is passed through a fixing unit 32 and discharged from an outlet 33 under the panel 9. The paper accommodated in the cassette 31 has its major axis positioned along the direction of transport thereof.

The present invention will be described with reference to FIG. 3 generally illustrating the invention.

The prism 8 is housed in a barrel and positioned on the barrel of the projection lens 7. The prism 8 is rotated by a motor 41, a gear 42 mounted on the shaft of the motor and a gear 43 formed around the prism barrel. The amount of rotation of the prism is detected by an orientation sensor E.

The control of the image rotation prism according to the present invention generally has the following two features. First of the features is that when the mode is changed to the printer mode, the direction of the image, i.e., the direction of the major axis of the frame of the film F, is detected, and the prism is automatically rotated so that this direction matches the major axis of the copy paper P. Since the direction of the major axis of the paper corresponds to the vertical direction on the screen 2, the prism is rotated to rotate the image when the frame is in a horizontally elongated position in the reader mode. To control the rotation of the motor 41 for this purpose, signals from a print switch B and image direction detecting means C are fed to image direction control means A. When the print signal is fed, the prism is controlled for rotation based on the image direction signal. An image rotation switch D, separately provided, further feeds a signal to the image direction control means A to rotate the image through a desired angle. The image rotation switch D is, for example, a bidirectional switch for commanding rotation of the motor 41 in the forward direction or reverse rotation selectively. This switch is used, for example, when information is recoreded in an inclined position relative to the frame.

The second feature is that the non-coincidence in direction between the image and the copy paper in printer mode is corrected upon detecting the orientation of the prism. The prism 8 used for this invention is minimized in size insofar as the image is rotatable as required. With a small prism a shown in FIG. 4, the optical axis Z incident on the prism from the projection lens 7 is not in coincidence with the optical axis Z' emergent from the prism, and an aberration δ occurs. Consequently, the image projected through the prism deviates vertically or horizontally according to the orientation of the prism. with the present invention, the signal from the orientation sensor E is fed to orientation judging means J to determine the orientation of the prism, and the deviation or aberration of the image relative to the copy paper is corrected by correction control means G.

Figure 5:
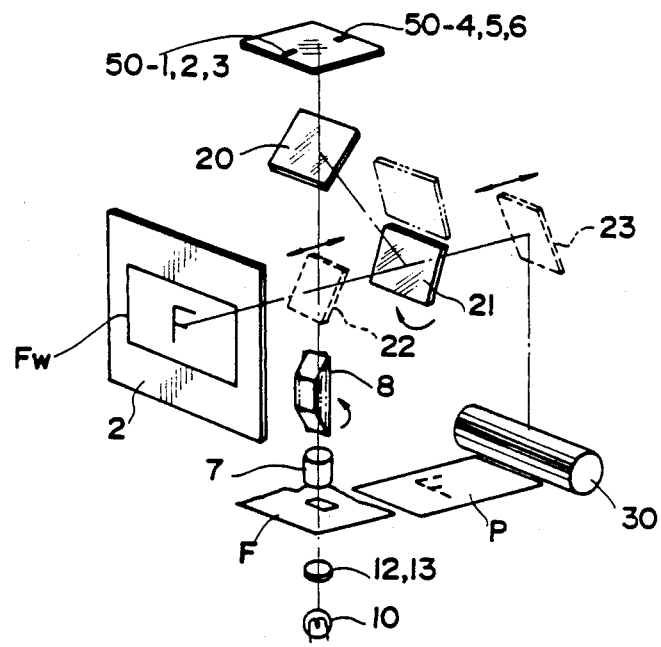
FIGS. 5 and 6 are fragmentary perspective views schematically showing the reader-printer.
Figure 6:
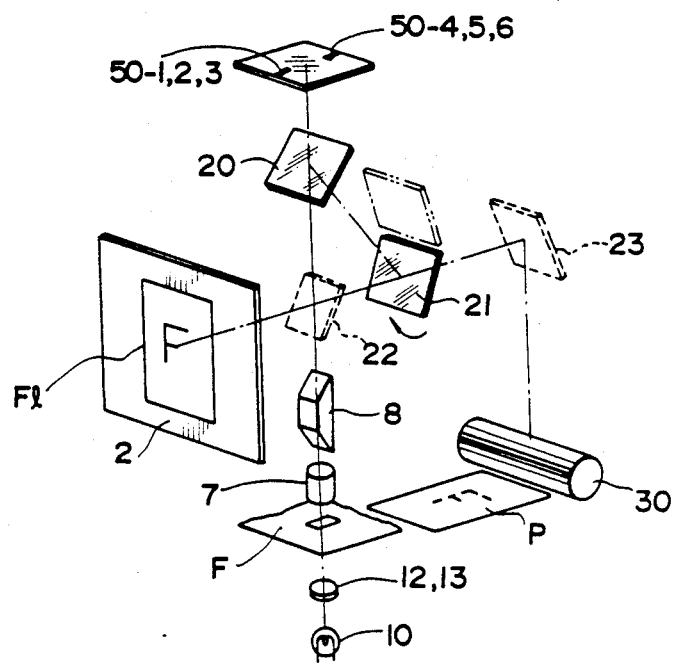

The above-mentioned first feature will be described first. FIGS. 5 and 6 are fragmentary perspective views schematically showing the reader-printer. FIG. 5 shows a case wherein information is recorded in a horizontal frame Fw, and FIG. 6 illustrates a case wherein information is recorded in a vertical frame F1. The fixed mirror 20 shown comprises a half mirror. Image direction detecting means C is so positioned as to receive the image light from the film passing through the mirror 20. The detecting means C includes three photodetectors 50-1, 2, 3 and three photodetectors 50-4,5,6 arranged at positions corresponding to the lower and upper ends of the screen 2, respectively. The two groups of photodetectors are so arranged that the image light through the vertically elongated frame F1 impinges on all the photodetectors but that the image light through the horizontally elongated frame Fw impinges on none of the detectors as shown in FIGS. 7A and 7B. Each photodetector used is a CdS element whose resistance value increases with a decrease in the amount of light received. These CdS elements are connected in series with fixed resistance to which a predetermined voltage is applied. The voltage between the fixed resistance and the CdS elements is delivered as a density signal.

The direction of the image is detected by rotating the image through 90 degrees (rotation I) and observing the change between the density signals before and after the rotation. In the case of a negative film, for example, if the density signal changes from great to small owing to rotation I, this means that the groups of photodetectors receive the light through the background area within the frame before rotation and the light through the transparent area around the frame after rotation. the result indicates that the image before rotation is vertically long as seen in FIG. 7A. Since the image has been rotated toward the horizontal direction for detecting the direction thereof, the image is rotated through 90 degrees again (rotation II) before printing. On the other hand, if the image before rotation is in a horizontal position as shown in FIG. 7B, rotation I brings the image to a vertical position, so that rotation II does not follow the detection. The direction of the image on a positive film can be detected similarly since the background area and the frame surrounding area are in a reverse relation to the above in density.

With reference to FIG. 8, detection signals CH1 to CH6 from the photodetectors are fed in parallel to an analog multiplexer 51 and successively delivered via an amplifier 52 and an A/D converter 53 to a microcomputer MC including CPU, ROM, RAM, etc.

The signals CH1 to CH6 are computed and processed within the microcomputer MC, which in turn feeds a motor drive signal to a motor drive circuit 54 from an output port PC0 for rotation I or II. Indicated at 55 in FIG. 8 is the print switch, and at 56 the image rotation switch for manually rotating the image. Switches 62, 64 and a motor MS will be described later.

Figure 9A:
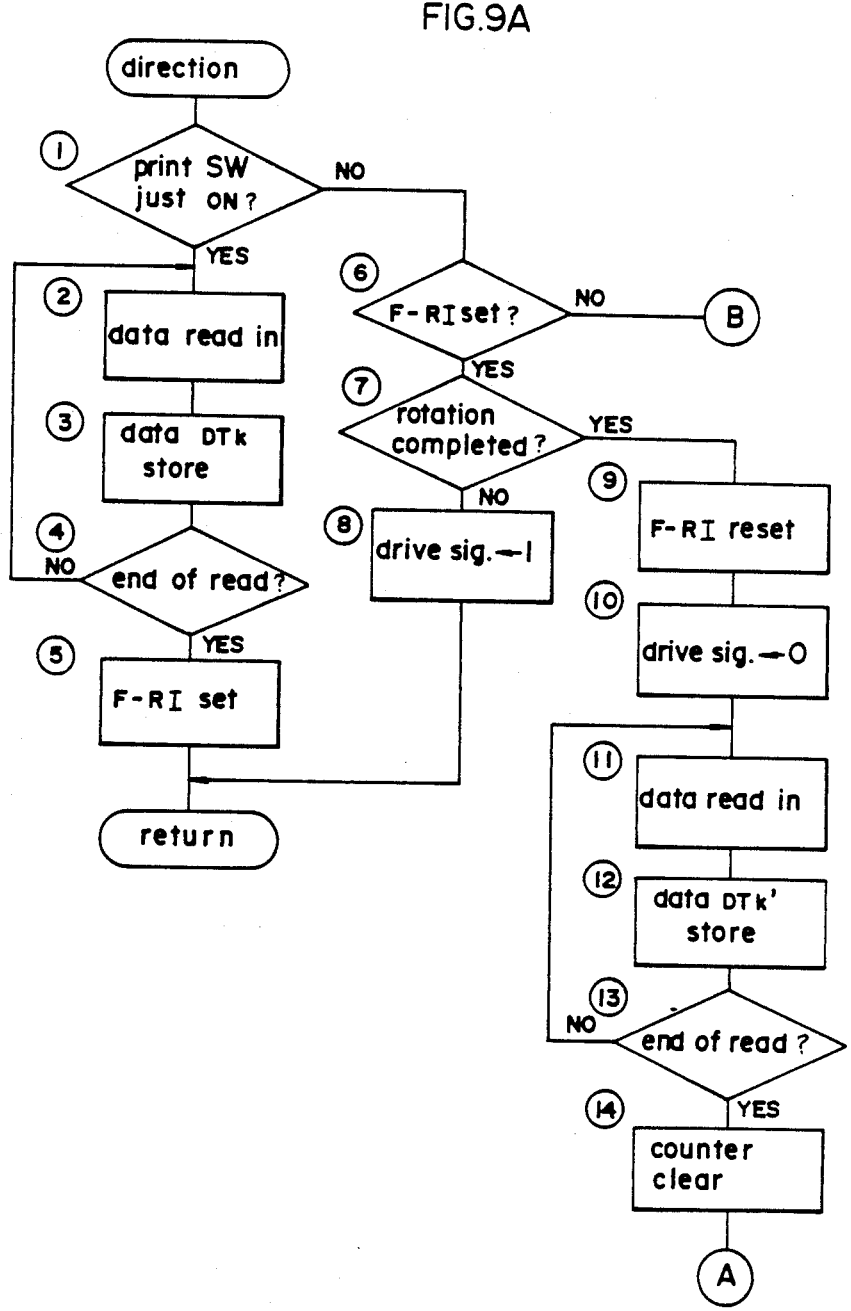
FIGS. 9A, 9B and 9C are flow charts for automatically controlling rotation of the prism according to the present invention.
Figure 9B:
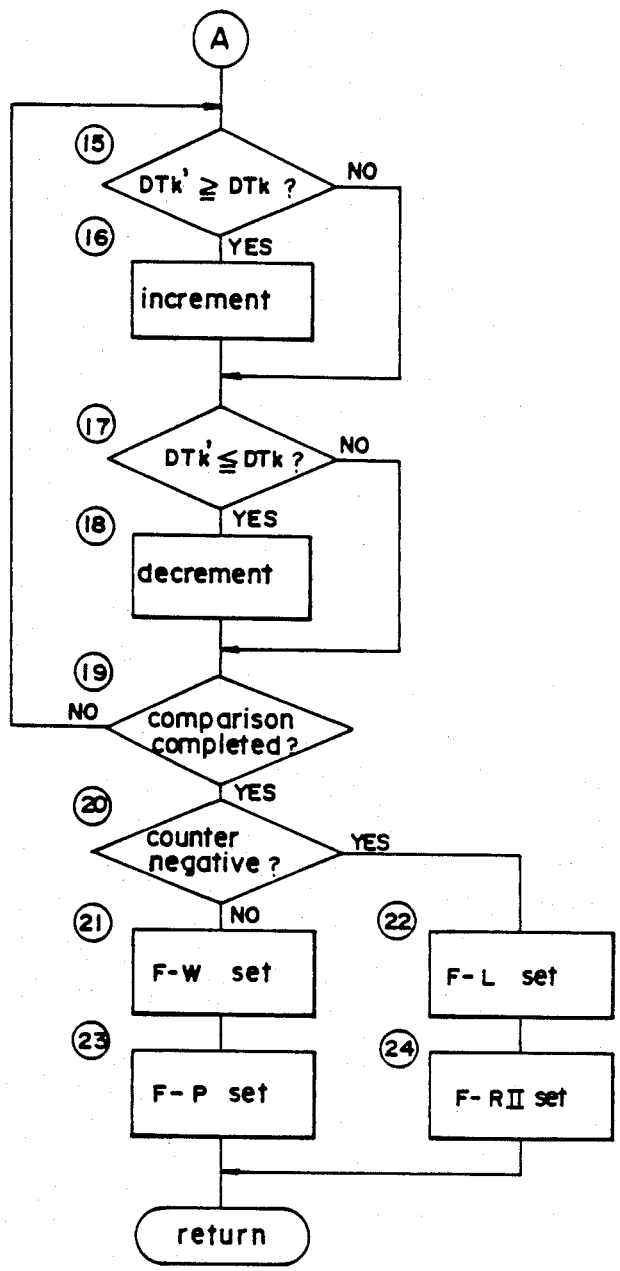
Figure 9C:
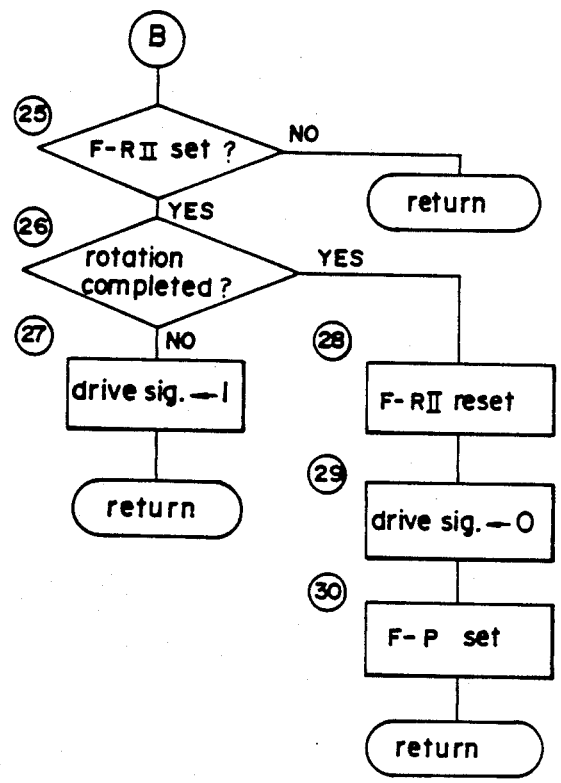

The control of the prism based on the detection of direction of the image will be described with reference to FIGS. 9A to 9C showing a subroutine for a negative film. The subroutine shown is initiated upon detection of closing of the print switch in the main routine (not shown).

Step 1 in FIG. 9A checks whether the print switch has just been turned on, in other words, whether the main routine has detected closing of the print switch and initiated the subroutine in a step of the main routine. If the answer to the interrogation is affirmative, steps 2, 3 and 4 read detection signals CH1 to CH6 and store the data as DTk (k=1 to 6) in the RAM. On completion of the storage of data, a flag F-RI is set to effect rotation I for detecting the direction of the image in step 5. The sequence then returns to the main routine.

On the other hand, if the answer to step 1 is NO, this means that the system is already in a process for judging the direction of the image, so that the flag F-RI is checked in step 6 as to whether it is set or reset. When the flag F-RI is found to be set, step 7 checks whether the image has been rotated through 90 degrees (rotation I) by rotating the prism 8 through 45 degrees. If rotation I has not been completed, a motor drive signal is emitted (step 8). If rotation I has been completed, the flag F-RI is reset in step 9, and the motor drive signal is discontinued in step 10.

Next in steps 11, 12 and 13, detection signals CH1 to CH6, after the image rotation are read, and the data is stored in other areas of the RAm as DTk' (k'=1 to 6). An image direction judging counter is cleared in step 14.

The direction of the image is determined in the subsequent steps 15 to 20. In steps 15 to 18, the data DTk before rotation, is compared with the data DTk' after the rotation by successively increasing k and k' by an increment each time. When DTk'≧DTk, the counter is advanced, while if DTk'≦DTk, subtraction is made on the counter. This is continued until the comparison is completed (step 19).

Step 20 determines the direction of the image before rotation from the value on the counter. When the counter value is 0 or positive, a flag F-W is set which indicates that the image before rotation is horizontally long (step 21). When the counter value is negative, a flag F-L is set which indicates that the image before rotation is vertically long (step 22).

If the image before rotation is horizontally long, rotation I has already brought the image to the vertical position suited to printing, so that a flag F-P for starting copying is set in step 23. On the other hand, if the image before rotation is vertically long, a flag F-RII is set in step 24 to effect rotation II for directing the image vertically again, followed by the main routine.

Referring to step 6 again, if the flag F-RI is not set, step 25 follows to check whether the flag F-RII is set or reset. When the result is affirmative, step 26 checks whether the image has been rotated through 90 degrees (rotation II) by rotating the prism 8 through 45 degrees in a direction reverse to that of rotation I. If rotation II has not been completed, a motor drive signal is produced (step 27). If otherwise, the flag F-RII is reset (step 28), the motor drive signal is discontinued (step 29), and the flag F-P is set (step 30). The sequence returns to the main routine.

The procedure of the foregoing flow chart automatically detects the direction of the image and the direction of the image is automatically changed to the direction suited to printing. A printing operation is thereafter conducted. On completion of printing, the image is returned to the original direction under an unillustrated program wherein the flags F-W and F-L are used. Although the flow chart of FIGS. 9A to 9C is desired for negative films, another program is prepared for positive films. In this case the relation involved in steps 15 to 18 between data and counter addition and substraction is reversed.

Figure 10:
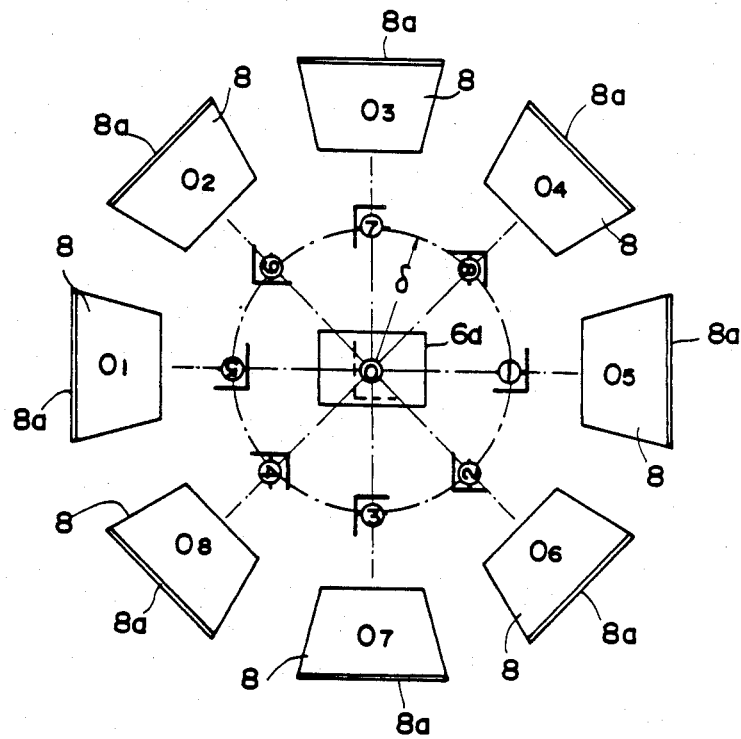
FIGS. 10 and 11 are diagrams showing the relation of the orientation of the prism with the abberation of an image.

Next, the second feature of the present invention will be described. As already stated, the emergence optical axis deviates from the incidence optical axis with the prism 8 used in the present embodiment. FIG. 10 shows such deviations or aberrations schematically. The character F represents the direction in which the image is rotated, the central point (0) shows the position of the incidence optical axis of the prism, and the other points (1) to (8) are positions of the emergence optical axis of the prism corresponding to different orientations of the prism. The orientations of the prism 8 are illustrated based on the long side of its trapezoidal shape as a reference surface 8a. For example, when the prism is used with orientation 02, the image is projected on the plane of projection in the direction ⌐ at position (2) to the right of and below the center.

Figure 11:
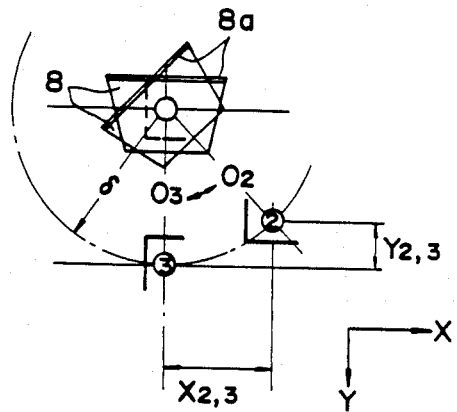

With reference to FIG. 11, an exemplary case will be described wherein the prism 8 is rotated through 45 degrees between orientation O2 and orientation O3. In the drawing, the left-to-right direction on the screen 2, which is perpendicular to the direction of feed of the paper, is indicated as the X direction, and the downward direction on the screen, which coincides with the paper feed direction, is indicated as the Y direction. Assuming that the amount of aberration of the emergence optical axis is 5 mm, the amount of aberration between the orientations 02 and 03 in the X direction, $S_{2,3}$, is 3.54 mm, and the corresponding aberration in the Y direction, $Y_{2,3}$, ' is 1.46 mm. The table below shows the amounts of aberrations in the X and Y directions between orientations 01 to 08.

| Orientation of prism | Aberration in X direction | Aberration in Y direction |
|---|---|---|
| 01 | | |
| | $X_{1,2} = $ ↔ 1.46 mm | $Y_{1,2} = $ ↕ 3.54 mm |
| 02 | | |
| | $X_{2,3} = $ ↔ 3.54 | $Y_{2,3} = $ ↕ 1.46 |
| 03 | | |
| | $X_{3,4} = $ ↔ 3.54 | $Y_{3,4} = $ ↕ 1.46 |
| 04 | | |
| | $X_{4,5} = $ ↔ 1.46 | $Y_{4,5} = $ ↕ 3.54 |
| 05 | | |
| | $X_{5,6} = $ ↔ 1.46 | $Y_{5,6} = $ ↕ 3.54 |
| 06 | | |
| | $X_{6,7} = $ ↔ 3.54 | $Y_{6,7} = $ ↕ 1.46 |
| 07 | | |
| | $X_{7,8} = $ ↔ 3.54 | $Y_{7,8} = $ ↕ 1.46 |
| 08 | | |
| | $X_{8,1} = $ ↔ 1.46 | $Y_{8,1} = $ ↕ 3.54 |
| 01 | | |

In the above table, each arrow shows the direction of aberration. The solid-line arrow and the subscripts (each representing the orientation of the prism) affixed to X or Y means that the prism is rotated from the orientation of the left subscript to the orientation of the right subscript, while the broken-line arrow means the reverse direction of rotation. When the prism is thus rotated, an aberration of the image occurs on the plane of projection. The present invention substantially eliminates this aberration.

The prism 8 is rotated to orient the image in a direction in which it is easy to read in the reader mode, and to orient the image in a direction suited to printing in the printer mode. According to the present embodiment, therefore, the orientations to be used in the reader mode are limited to 02, 03, 04 and 05, because if a counterclockwise direction is determined as the direction of rotation of the prism in the printer mode, the amount of aberration in the X direction that results from rotation from each of orientations 02 to 05 to the next orientation is in the same direction for these orientations.

Figure 12A:
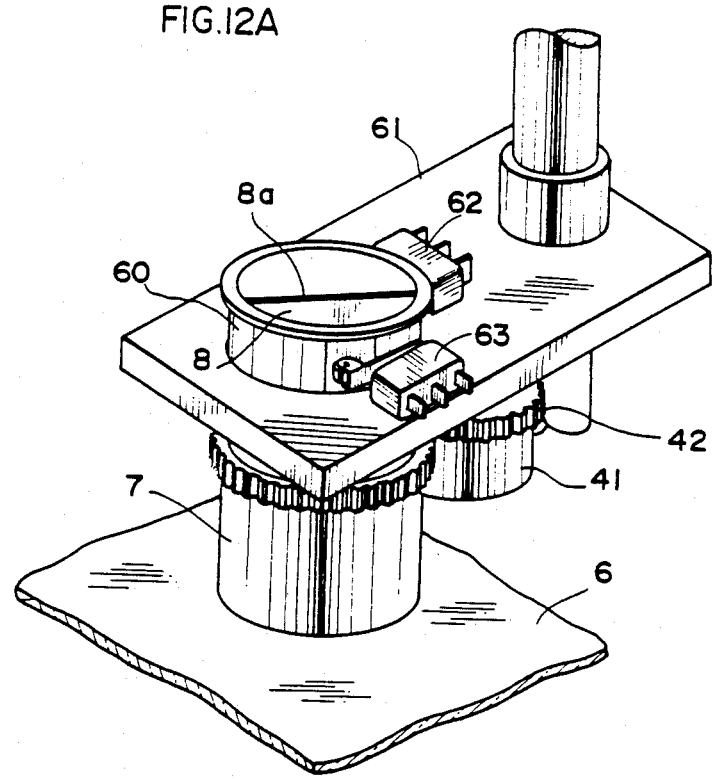
FIGS. 12A and 12B are a perspective view and a plan view, respectively showing means for detecting the orientation of the prism.
Figure 12B:
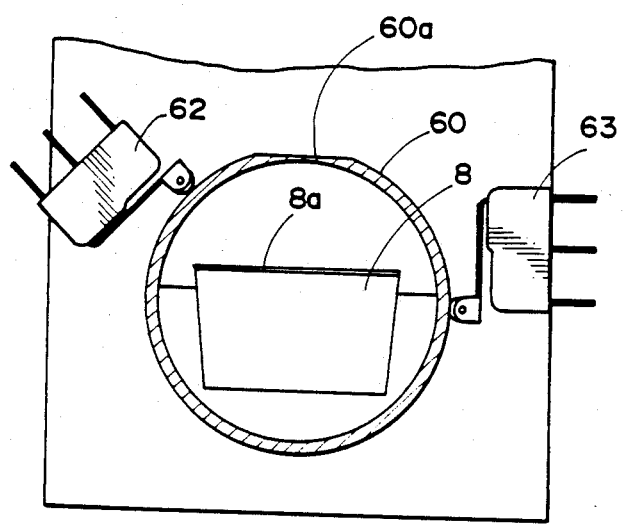

Means for detecting these orientations 02 to 05 will be described with reference to FIGS. 12A and 12B. The prism 8 is housed in a barrel 60, which is rotatably fitted in an opening in a vertically movable holder plate 61 and placed on the barrel of the projection lens 7. When the projection lens 7 is to be changed, the prism 8 is moved away from the lens 7 by being lifted above the holder plate 61. Two microswitches 62 and 63 are mounted on the holder plate 61 and spaced apart from each other by 135 degrees about the optical axis. The microswitches 62 and 63 are turned off when opposed to a planar portion 60a which is formed by partly cutting off the barrel 60. The planar portion 60a is in parallel with the reference face 8a of the prism. The orientation of the prism 8 is detected from the on-off state of the two microswitches thus arranged.

The aberration is corrected according to the orientation thus detected. For aberrations in X direction, the paper is in a position shifted in advance by 1.77 mm which is the average of the maximum amount of aberration in the X direction, i.e., 3.54 mm, and the amount of aberration in the case where printing is conducted without rotating the image, i.e., 0 mm, according to the present embodiment. This is because correction is more difficult in the X direction than in the Y direction and further because the preset deviation of about 1.77 mm will not substantially affect the quality of copies. On the other hand, the aberration in the Y direction is corrected by varying the operation timing of the image scanning mirror system relative to the paper which is fed with predetermined timing. The mirror system is reciprocatingly moved by a motor MS shown in FIG. 8. the motor MS is connected to a power supply VM via relays RY1 and RY2, which are connected to ports PB0 and PB1 of the microcomputer, respectively, and have their contacts switched in response to outputs from the ports to control the energization of the motor MS and the direction of current flow through the motor.

The microswitches 62 and 63 are connected to an output portion PA0 of the microcomputer and to input ports PA1, PA2 thereof respectively. According to the inputs from these switches, the microcomputer controls the scan timing as shown in FIG. 13.

Figure 13:
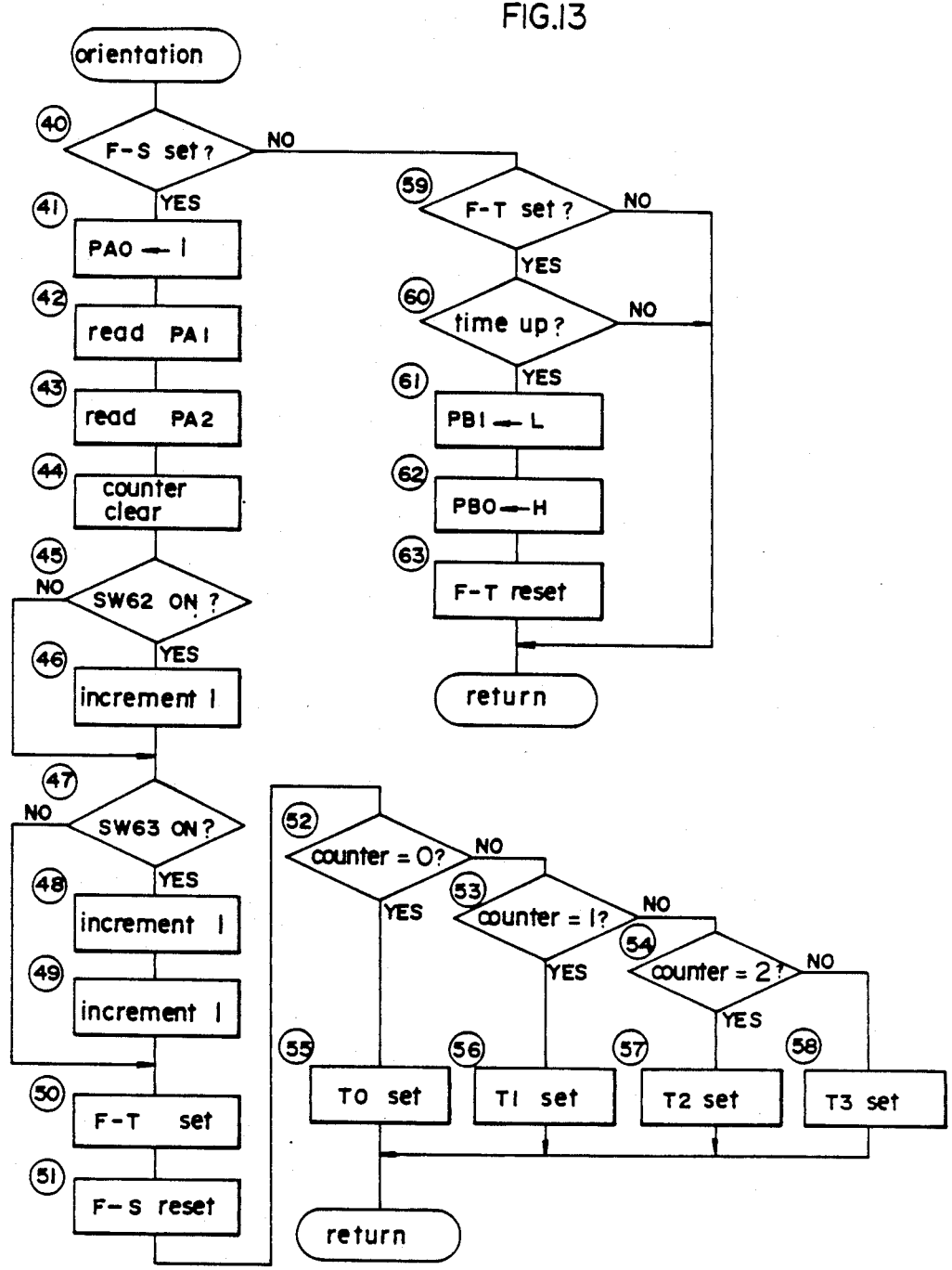
FIG. 13 is a control flow chart for correcting the amount of abberation according to the invention.

With reference to FIG. 13, step 40 checks whether a scan flag F-S is set. The scan flag F-S is set when the print switch is turned on. If the answer is affirmative, an output is delivered from the output port PAO, and the state of the switches 62 and 63 is read into the microcomputer with reference to the input to the input ports PA1 and PA2 in steps 41 to 43. In step 44, a counter is cleared. In accordance with the state of the switches 62 and 63, the counter is operated in steps 45 to 49. When the two switches are off, the counter is not changed. The counter is advanced by 1 increment when only the switch 62 is on, by 2 increments when only the switch 63 is on, or by 3 increments when both switches are on. A timer flag F-T is set and the scan flag F-S is reset in steps 50 and 51.

Subsequently in steps 52 to 58, a timer value T0, T1, T2 or T3 is set according to the counter value, and the sequence returns to the main routine. The timer values are determined according to the amounts of aberrations listed above.

When the scan flag F-S is found to be reset in step 40, step 59 follows to check whether the timer flag F-T is set or reset. If it is set, step 60 checks the timer set in one of steps 55 to 58 for the lapse of time set thereon. When time-up state is detected, output "L" is given from the output port PB1 and "H" from the port PB0 in steps 61 and 63 to start scanning. Next, the timer flag F-T is reset, followed by the main routine.

According to the above program, the orientation of the prism 8 is detected, and the start of scanning is controlled in corresponding relation to the amount of aberration in the Y direction with respect to the detected orientation, whereby the aberration in the Y direction is properly corrected.

The aberration in the Y direction may be variably corrected by altering the paper feed timing. For the correction of aberrations in the X direction, the paper feeder itself or the paper cassette may be made shiftable in the X direction by a solenoid. Alternatively, for the same purpose, the paper may be obliqued in the path of transport from the feed station to the transfer station, and the amount of oblique motion controlled by a side guide which is moved according to the amount of aberration in the X direction.

Although the present invention has been fully described by way of examples with reference to the accompanying drawings, it is to be noted that various changes and modifications will be apparent to those skilled in the art. Therefore, unless otherwise such changes and modifications depart from the scope of the invention, they should be construed as being included therein.

What is claimed is:

1. A reader-printer comprising:
    projection means for projecting an image of a microfilm to a screen and onto a photosensitive medium;
    copy forming means for forming the image projected onto the photosensitive medium into copies;
    feed means for feeding copy papers toward the photosensitive medium;
    an image rotation prism disposed in a light path of said projection means and having aberration between light axes incident thereto and emitted therefrom; and
    elimination means for eliminating a difference between a location of the projected image and a location of the fed paper so as to form the image coincidentally onto the copy paper irrespective of aberration of the light axes.

2. A reader-printer of claim 1, wherein said prism has a trapezoidal shape.

3. A reader-printer of claim 1, wherein said prism is disposed adjacent a projection lens.

4. A reader-printer with a reader mode and print mode comprising:
    projection means for projecting an image of a microfilm to a screen and onto a photosensitive medium;
    copy forming means for forming the image projected onto the photosensitive medium;
    feed means for feeding copy papers toward the photosensitive medium;
    an image rotation means disposed in a light path of said projection means for optically rotating the image;
    drive means for driving siad image rotation means;

discrimination means for detecting whether or not the orientation of the projected image agrees with the orientation of the fed paper; and control means, in response to disagreement detected by said discrimination means, for controlling said drive means so as to be driven at the time of a mode change from the reader mode to the print mode.

5. A reader-printer of claim 4, wherein said discrimination means includes a detection means for detecting the orientation of the projected image.

6. A reader-printer of claim 4, wherein said control means controls the drive means so as to rotate the projected image through right angles.

* * * * *